US009821932B2

(12) United States Patent
Quinn et al.

(10) Patent No.: US 9,821,932 B2
(45) Date of Patent: Nov. 21, 2017

(54) DISPENSING/MEASURING CAP/CUP

(71) Applicant: CHURCH & DWIGHT CO., INC., Princeton, NJ (US)

(72) Inventors: H Stephen Quinn, Eau Claire, WI (US); Albert H. Lund, Westfield, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 107 days.

(21) Appl. No.: 14/349,700

(22) PCT Filed: Oct. 4, 2012

(86) PCT No.: PCT/US2012/058697
§ 371 (c)(1),
(2) Date: Apr. 4, 2014

(87) PCT Pub. No.: WO2013/052627
PCT Pub. Date: Apr. 11, 2013

(65) Prior Publication Data
US 2014/0319095 A1    Oct. 30, 2014

Related U.S. Application Data

(60) Provisional application No. 61/543,026, filed on Oct. 4, 2011.

(51) Int. Cl.
*B65D 41/00* (2006.01)
*B65D 41/26* (2006.01)
*B65D 41/04* (2006.01)
*G01F 19/00* (2006.01)

(52) U.S. Cl.
CPC .............. *B65D 41/26* (2013.01); *B65D 41/04* (2013.01); *G01F 19/00* (2013.01); *B65D 2203/04* (2013.01)

(58) Field of Classification Search
CPC ...... B65D 41/26; B65D 41/04; B65D 41/265; B65D 47/122; G01F 19/00
USPC ........................................................ 215/365
See application file for complete search history.

(56) References Cited

U.S. PATENT DOCUMENTS

| | | |
|---|---|---|
| 4,550,862 A | 11/1985 | Barker et al. |
| 4,895,257 A | 1/1990 | Winslow |
| 5,345,784 A * | 9/1994 | Bazemore et al. ............. 62/371 |
| 5,431,306 A * | 7/1995 | Reid .............................. 222/111 |
| 5,865,331 A * | 2/1999 | Jacobs .......................... 215/228 |
| 6,631,744 B1 | 10/2003 | Gerhart et al. |
| 6,691,946 B2 * | 2/2004 | Dannecker et al. ....... 242/588.6 |
| 7,306,120 B2 | 12/2007 | Hughes |

(Continued)

OTHER PUBLICATIONS

International Search Report for PCT/US2012/058697, dated Jan. 4, 2013, which corresponds to this subject application.

*Primary Examiner* — Anthony Stashick
*Assistant Examiner* — Ernesto Grano
(74) *Attorney, Agent, or Firm* — Church & Dwight, Co., Inc.

(57) ABSTRACT

The dispensing cap/cup (26) has a sidewall (100) and a transverse web (102) spanning the sidewall to create a cup structure. The sidewall has an interior surface and an exterior surface. The sidewall has a plurality of fill level indicia (140, 142) along the interior surface. The fill level indicia comprise a raised boundary (150) and texturing (152) within the boundary.

10 Claims, 4 Drawing Sheets

(56) References Cited

U.S. PATENT DOCUMENTS

| | | | |
|---|---|---|---|
| 7,959,034 B2 | 6/2011 | Faaborg et al. | |
| 2001/0030165 A1* | 10/2001 | Jacobs | 215/329 |
| 2005/0139568 A1* | 6/2005 | Falk | 215/12.2 |
| 2007/0095779 A1* | 5/2007 | Garcia-Ruiz et al. | 215/12.2 |
| 2007/0257057 A1* | 11/2007 | Molloy et al. | 222/109 |
| 2008/0164282 A1* | 7/2008 | Szekely et al. | 222/111 |
| 2009/0045224 A1* | 2/2009 | Faaborg et al. | 222/111 |
| 2009/0193890 A1* | 8/2009 | Mentesh | 73/427 |
| 2009/0229360 A1* | 9/2009 | Harvey | 73/427 |
| 2011/0226721 A1 | 9/2011 | Horstman et al. | |
| 2011/0239760 A1* | 10/2011 | Su | 73/427 |
| 2011/0272301 A1* | 11/2011 | Saulle | 206/219 |
| 2011/0290756 A1* | 12/2011 | Horstman et al. | 215/329 |
| 2014/0326628 A1* | 11/2014 | Fox et al. | 206/459.5 |
| 2014/0361016 A1* | 12/2014 | Moreau | 220/502 |

\* cited by examiner

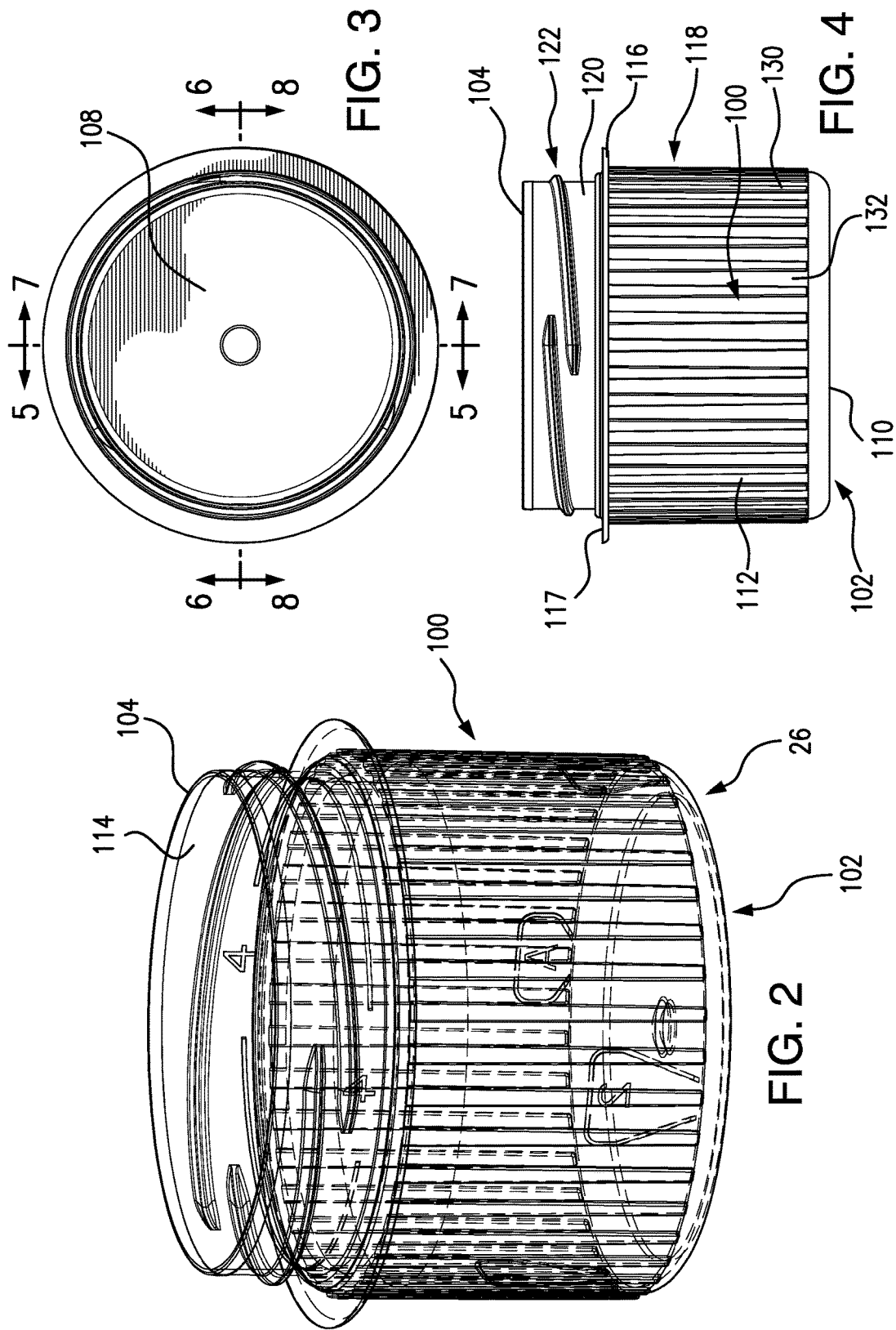

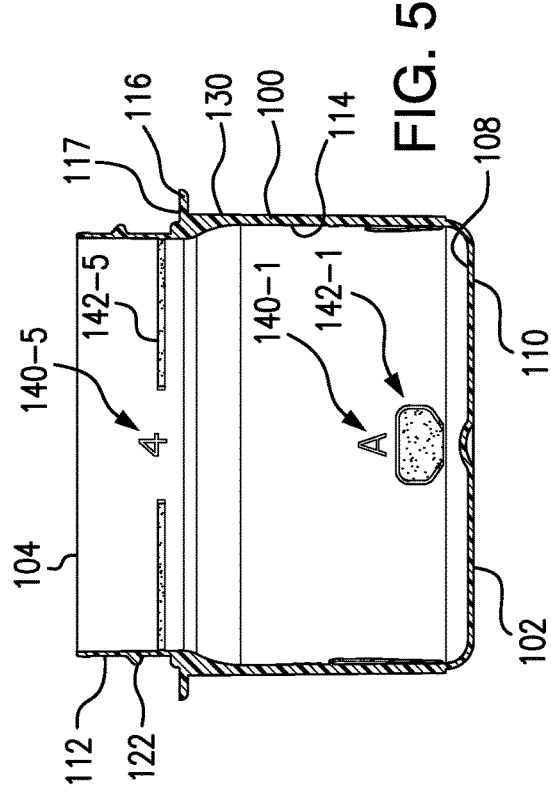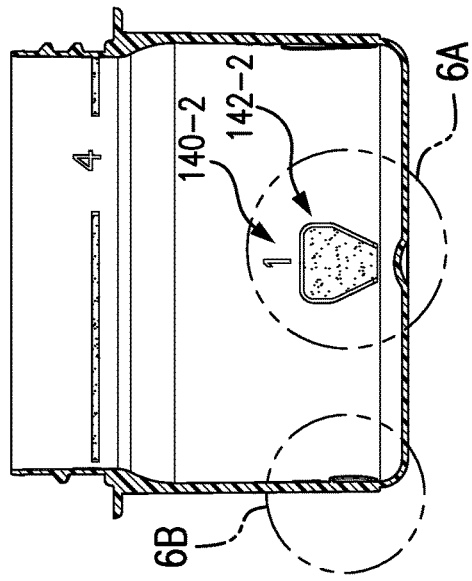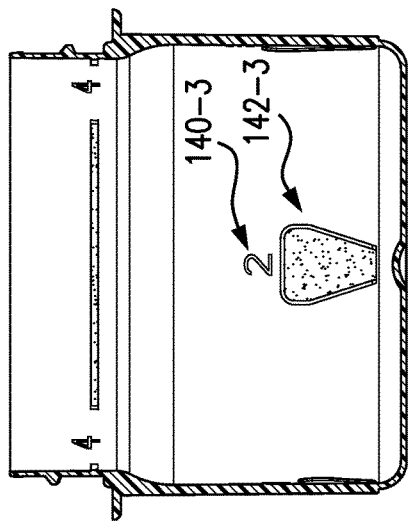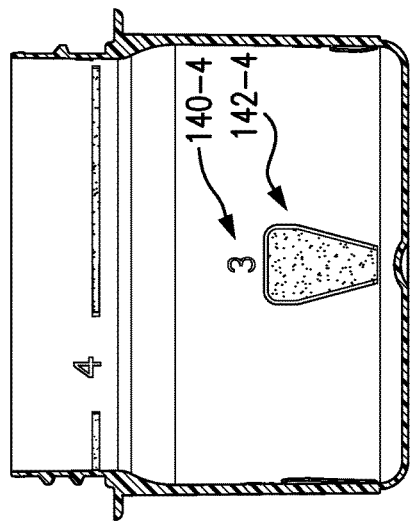

DISPENSING/MEASURING CAP/CUP

CROSS-REFERENCE TO RELATED APPLICATIONS

Benefit is claimed of U.S. Patent Application Ser. No. 61/543,026, filed Oct. 4, 2011, the disclosure of which is incorporated by reference herein as if set forth at length.

BACKGROUND OF THE INVENTION

The invention relates to containers. More particularly, the invention relates to pour spouts for containers for liquid laundry detergent and the like.

There has been an evolution in the configuration of containers for liquid laundry detergent, fabric softener, and the like. The dominant form of container is a wide mouth bottle having an attached spout with a drain-back trough and aperture. In a typical group of container configurations and their methods of assembly, a bottle, spout fitment, and cap are individually molded (e.g., of high density polyethylene (HDPE)). Exemplary bottle molding is via roto-molding whereas exemplary spout fitment and cap molding are by injection molding. An exemplary spout fitment includes the spout and a continuation of the spout defining the base and outboard wall of the trough. The fitment further typically includes a flange (e.g., extending outward at an upper end of the outboard extremity of the trough).

The spout fitment may be inserted through a mouth of the bottle (e.g., so that an outer surface of the outboard trough wall whereof another wall outboard thereof engages the inner surface of the bottle neck). The spout fitment may be secured and sealed to the bottle such as by spin welding. The bottle may be filled and the cap may be installed. Exemplary caps typically have either an externally threaded skirt for engaging an internally threaded portion of the fitment or an internally threaded skirt for engaging an externally threaded portion of the fitment or bottle neck. With a typical externally threaded skirt, the cap includes an outwardly projecting flange above the skirt. Upon installation of the cap to the fitment, the flange underside contacts and seals with the fitment flange upper surface to seal the bottle.

One recently-proposed bottle configuration is shown in US2008/0164282, the disclosure of which is incorporated by reference in its entirety herein as if set forth at length.

SUMMARY OF THE INVENTION

One aspect of the disclosure involves a dispensing cap/cup having a sidewall and a transverse web spanning the sidewall to create a cup structure. The sidewall has an interior surface and an exterior surface. The sidewall has a plurality of fill level indicia along the interior surface. The fill level indicia comprise a raised boundary and texturing within the boundary.

In various embodiments, at least some of the indicia boundaries have off-longitudinal lateral portions. Each of the indicia may further include a raised alphanumeric indicator. A flange may protrude outward from the sidewall exterior surface and an external thread may be along the sidewall between the flange and a rim. The cap/cup may be a unitary molding. There may be an exemplary three-six said indicia circumferentially spaced from each other and positioned to respectively indicate different fill levels. There may be at least one additional raised circumferential level indicia. Each of the boundaries may have a closed protuberant end with the lateral portions converging toward the web.

Another aspect of the disclosure involves a dispensing cap/cup having a sidewall and a transverse web spanning the sidewall to create a cup structure. The sidewall has an interior surface and an exterior surface. The sidewall has a plurality of fill level indicia along the interior surface. The fill level indicia comprise a raised boundary having off-longitudinal lateral portions.

Another aspect of the disclosure involves a container having a bottle body, a spout fitment secured to the bottle body, and a cap/cup of any of the foregoing embodiments in threaded engagement to one of the bottle body and spout fitment.

In one or more further embodiments, the spout fitment may be a drain back-spout fitment and the cap may be externally threaded.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is an x-ray view of a cap/cup of the bottle.

FIG. 3 is a bottom/underside view of the cap/cup.

FIG. 4 is a side view of the cap/cup.

FIG. 5 is a first vertical/axial sectional view of the cap/cup taken along line 5-5 of FIG. 3.

FIG. 6 is a second vertical/axial sectional view of the cap/cup taken along line 6-6 of FIG. 3.

FIG. 7 is a third vertical/axial sectional view of the cap/cup taken along line 7-7 of FIG. 3.

FIG. 8 is a fourth vertical/axial sectional view of the cap/cup taken along line 8-8 of FIG. 3

Like reference numbers and designations in the various drawings indicate like elements.

DETAILED DESCRIPTION

Figure 1:
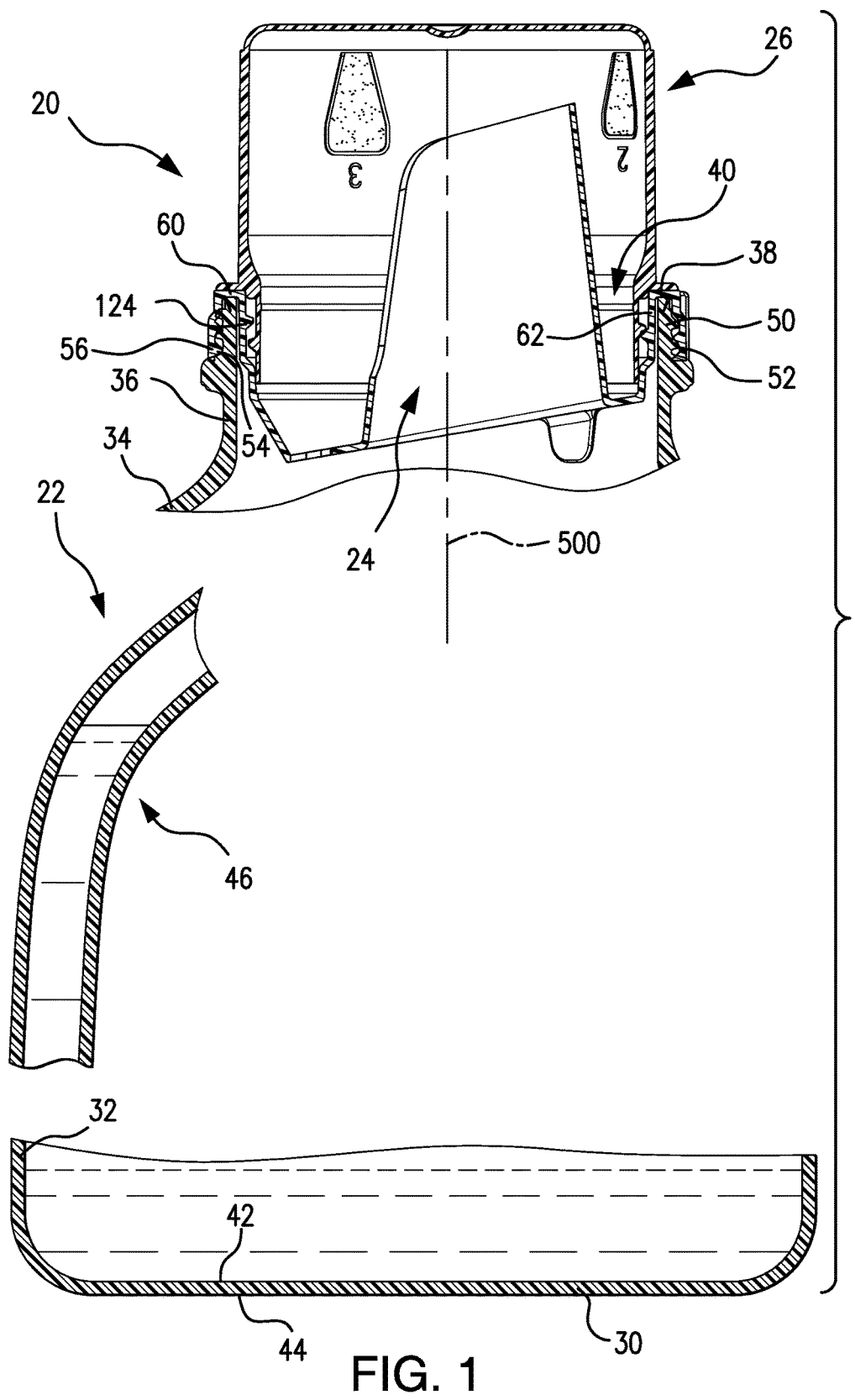
FIG. 1 is a central vertical/axial sectional view of a bottle.

FIG. 1 shows a container 20 comprising the assembly of a bottle body 22, a drain-back spout fitment 24, and a cap 26 (which may serve as a measuring/dispensing cup). Each may be made as a unitary plastic molding. Exemplary bottle body material is high density polyethylene (HDPE). Exemplary spout fitment and cap material is polypropylene.

The exemplary body 22 comprises a unitary combination of a base 30, a sidewall 32 extending upward from the base, a shoulder 34 at an upper end of the sidewall, and a neck 36 extending upward from the shoulder to a rim 38 and defining an opening 40 having a central longitudinal axis 500. The bottle body has an interior surface 42 and an exterior surface 44. A handle 46 (FIG. 1) may extend from the sidewall and the body interior may extend through the handle. An upper portion 50 of the neck bears an external thread 52. The external thread 52 engages an internal thread 54 of an outer wall 56 of the spout fitment. The spout fitment has an annular rim or flange portion 60 joining an upper end of the outer wall 56 to the upper end of an inner wall 62.

FIGS. 2-8 show further details of the cap/cup 26. The cap/cup 26 comprises a sidewall 100 which extends from a first end at a junction with a transverse web 102 to a second end forming a rim 104. When the cap/cup is used as a cap, the transverse web 102 forms a top of the cap. When used as a cup, the transverse web forms a base/bottom of the cup. The transverse web includes an interior surface 108 (FIG. 3) and an exterior surface 110 (FIG. 4). Similarly, the sidewall has an exterior surface 112 (FIG. 4) and an interior surface 114 (FIG. 2). In the exemplary embodiment, a flange 116 protrudes radially outward from the sidewall exterior surface and has an underside 117. The flange 116 essentially separates a first portion 118 of the sidewall (between the flange and the transverse web and being an upper portion when serving as a cap) from a second portion 120 (between the flange and the rim 104). The second portion 120 bears an external thread 122 for mating with the internal thread 124 (FIG. 1) along the inner wall 62 of the exemplary spout fitment.

Along the first portion 118 of the sidewall, the exemplary sidewall bears a plurality of axial/longitudinal ribs 130 with spaces/channels 132 therebetween. These provide for gripping by the user to screw the cap on and unscrew it.

FIG. 5 shows yet further details of the exemplary cap/cup. The interior surface 114 bears a plurality of fill indicia. Each exemplary indicia comprises the combination of an alphanumeric indicia 140-1, 140-2, 140-3, 140-4, and 140-5 with a respective geometric indicia 142-1, 142-2, 142-3, 142-4, and 142-5. Each of the exemplary alphanumeric indicia comprises a molded-in protrusion. The exemplary alphanumeric indicia are, respectively: "A"; "1"; "2"; "3"; and "4". These indicate progressively higher fill quantities/doses.

In the exemplary implementation, each of the first four indicia are circumferentially spaced from each other. Each of the exemplary first four graphical/geometric indicia comprises a sidewall structure 150 (FIGS. 6A&B) forming a raised boundary/perimeter at least partially surrounding a textured enclosed region 152 of the sidewall interior surface. An exemplary height $H_1$ of the raised boundary/perimeter is 0.010 inch (more broadly, 100-500 micrometer or 200-300 micrometer) above the surrounding interior surface. An exemplary width $W_1$ of the raised boundary/perimeter is 0.020 inch (more broadly, 0.2-1.0 mm or 0.4-0.6 mm). An exemplary overall indicia width is 0.439 inch (more broadly, 5-20 mm or 8-15 mm). An exemplary overall graphical indicia length $L_1$ may, in the particular example, vary progressively from indicia to indicia to correspond with the dose and, thereby, provide yet further emphasis of which dose is involved. Exemplary individual indicia may be an exemplary 0.2-1.5 inch (5-38 mm) with a progressive change totaling at least fifty percent from the smallest indicia to the largest indicia.

The exemplary texturing of region 150 is schematically shown via diagonal hatching. An example of such texturing is rougher/coarser than the smooth surface therearound (e.g., a fine orange peel texture or a more coarse/grit-like. The texturing may be generated by local electrodischarge machining (EDM) or other roughening of the tool (mold). With a transparent or nearly transparent cap, the texturing may create a more opaque local area of relative translucence. Exemplary texture as applied to the tool is Mold-Tech MT-11050 (Standex International Corporation, Salem N.H., US) texture (more broadly MT-11010 (25 micron average depth)-MT-11050 (110 micron average depth) or other EDM equivalent).

Each exemplary graphical indicia comprises a protuberant end region 154 (an upper end when in the rim-up cup orientation). Lateral portions of the boundary at least partially converge toward the web (i.e., project toward the web and converge toward each other). For example, the exemplary sidewall has a circumferentially extending end portion 156 with a pair of lateral sidewalls extending therefrom toward the web. Each exemplary lateral sidewall comprises a proximal portion 158A, 158B, and a distal portion 160A, 160B. In the exemplary embodiment, the proximal portions are essentially axial and the distal portions converge at an off-axial angle θ (e.g., 26°, more broadly, 20-65°, 20-45° or 28°-35°). θ may change from indicia to indicia. Particularly in the case of transparent or translucent caps, the angling of these sidewall portions 160A, 160B helps visually distinguish them from traces of the axial ribs seen through the cap/cup sidewall 100.

Figure 6A:
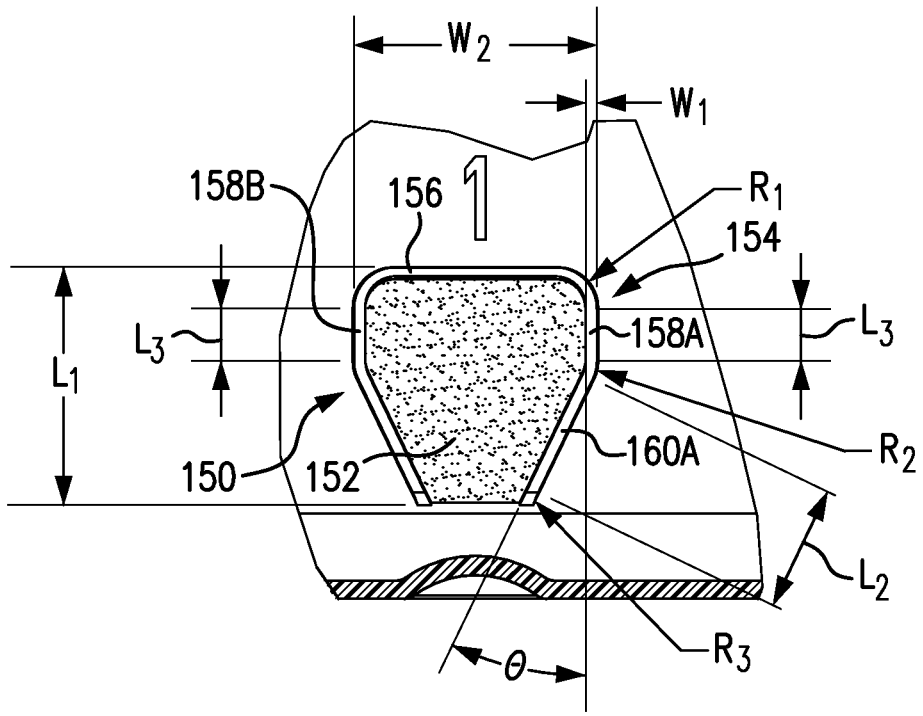
FIG. 6A is an enlarged view of the cap/cup of FIG. 6 showing an indicia in near elevation.
Figure 6B:
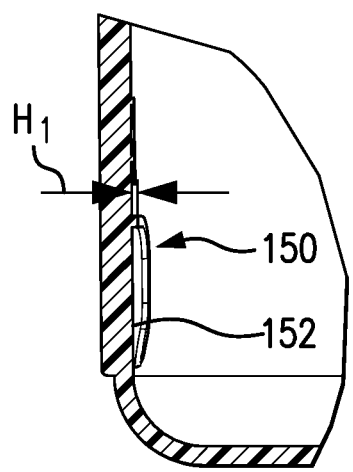
FIG. 6B is an enlarged view of the cap/cup of FIG. 6 showing another indicia in section.

Exemplary lengths of the distal portions 160A, 160B are 0.228 inches (more broadly, 4-10 mm). Exemplary lengths of the proximal portions 158A, 158B may, as noted above, vary from indicia to indicia proportional to the dosage. FIG. 6A also shows a radius of curvature $R_1$ between the end portion 156 and proximal portions and a radius of curvature $R_2$ between the proximal portions and associated distal portions. A $R_3$ may be present at the lower/distal ends of the distal portion (e.g., convexly rounding the end of the border). Exemplary $R_3$ is 0.03 inch (more broadly 0.5-1.5 mm).

The exemplary fifth fill indicia is a relatively high indicia and its graphical component 142-5 may be a conventional circumferential linear level indicator (e.g., formed as a raised rib). Alphanumeric indicator height may be similar to perimeter height $H_1$. Rib height may be similar. Rib width may be greater than perimeter width. Alphanumeric indicator planform (font) size may be an exemplary 4-10 mm in character height.

One or more embodiments of the present invention have been described. Nevertheless, it will be understood that various modifications may be made without departing from the spirit and scope of the invention. For example, implemented in the reengineering of an existing cap/cup or container, details of the existing cap/cup may influence details of any particular implementation. Accordingly, other embodiments are within the scope of the following claims.

What is claimed is:

1. A dispensing cap/cup (26) comprising:
   a sidewall (100) having an interior surface and an exterior surface; and
   a transverse web (102) spanning the sidewall to create a cup structure, wherein the sidewall has a plurality of fill level indicia (140, 142) along the interior surface, the fill level indicia comprising:
   a raised boundary (150) defining a region (152) that is at least partially surrounded by the raised boundary, the region defined by the raised boundary being textured, wherein the raised boundary has a closed protuberant end (154) with raised lateral portions converging toward the transverse web, wherein the raised lateral portions comprise proximal portions axially extending from the protuberant end relative to a longitudinally extending axis of the dispensing cap/cup and the raised lateral portions comprise distal portions converging from the proximal portions toward the transverse web at an angle relative to the longitudinally extending axis of the dispensing cap/cup.

2. The cap/cup of claim 1 wherein:
   at least some of the indicia boundaries have off-longitudinal lateral portions (160).

3. The cap/cup of claim 1 wherein:
   each of the indicia further include a raised alphanumeric indicator (140).

4. The cap/cup of claim 1 further comprising:
   a flange protruding outward from the sidewall exterior surface; and an external thread along the sidewall between the flange and a rim.

5. The cap/cup of claim 1 being a unitary molding.

6. The cap/cup of claim 1 wherein:
there are 3-6 said indicia circumferentially spaced from each other.

7. The cap/cup of claim 1 further comprising:
at least one additional raised circumferential fill level indicia.

8. The cap/cup of claim 1, wherein a height of the raised boundary is about 100 micrometers to about 500 micrometers.

9. A container (20) comprising:
a bottle body (22);
a spout fitment (24) secured to the bottle body; and
the cap/cup of claim 1 in threaded engagement to one of the bottle body and spout fitment.

10. The container of claim 9 wherein:
the spout fitment is a drain-back spout fitment; and
the cap is externally threaded.

* * * * *